Figure 1:
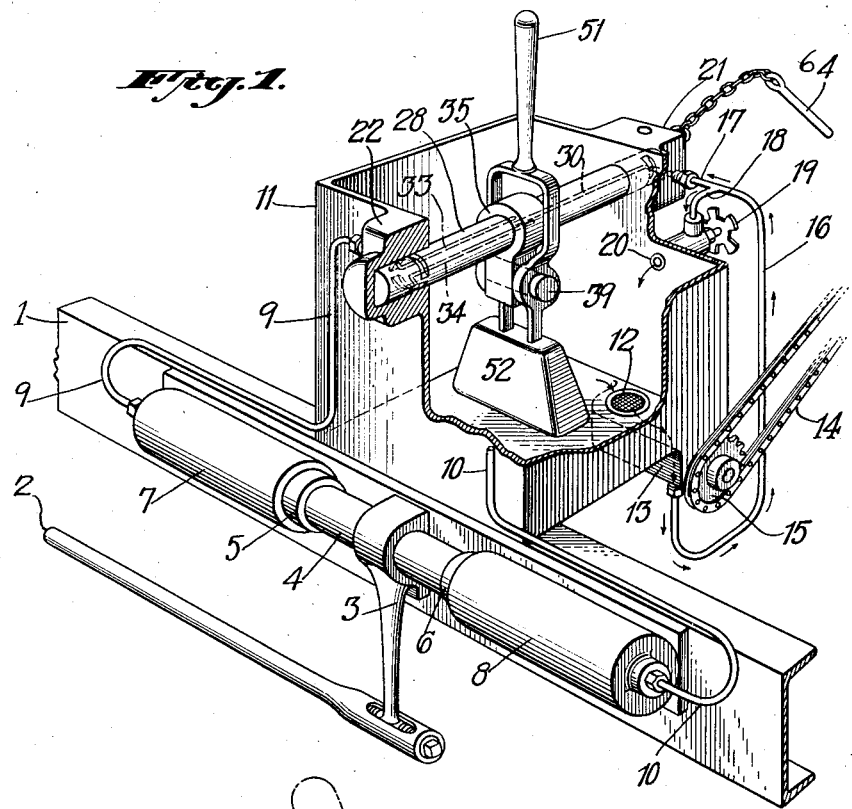

Oct. 25, 1938.  W. A. WOOD  2,134,426

DIRECTIONAL CONTROL OF VEHICLES

Filed Feb. 15, 1938   2 Sheets-Sheet 1

INVENTOR
WALTER A. WOOD.
BY
*Ward Crosby & Neal*
his ATTORNEY

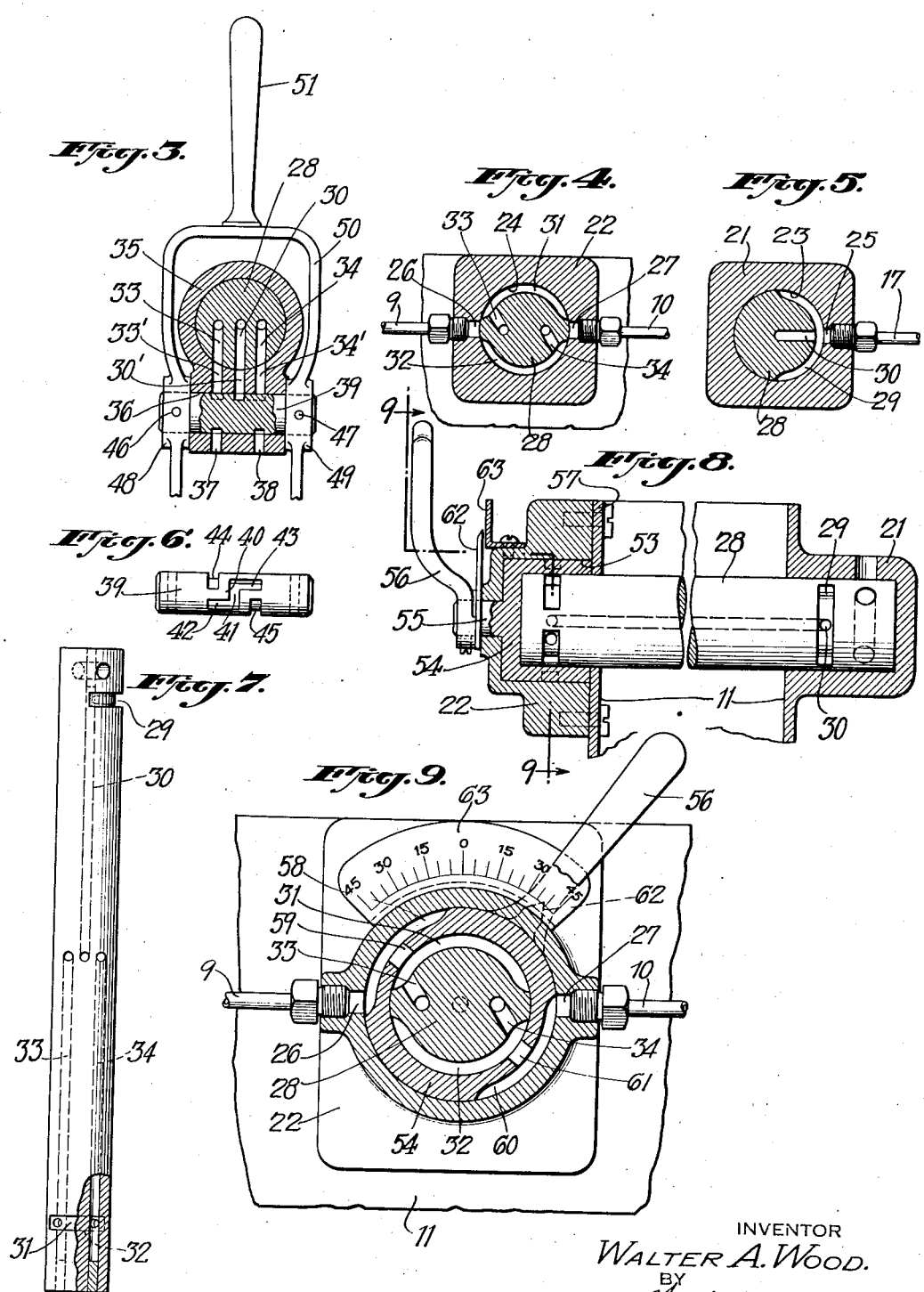

Patented Oct. 25, 1938

2,134,426

UNITED STATES PATENT OFFICE 2,134,426

DIRECTIONAL CONTROL OF VEHICLES

Walter A. Wood, Jackson Heights, N. Y.

Application February 15, 1938, Serial No. 190,567

12 Claims. (Cl. 180—79.2)

This invention relates to directional control of vehicles, and more particularly vehicles adapted to travel over the ground or other solid surfaces. The invention is more especially intended for automotive vehicles, but it is within the contemplation of the invention that it may be useful otherwise.

The invention is especially useful in such work as contour cultivation of agricultural lands, either to establish plowed fields or in the cultivation of plowed fields, but this is only one of many possible uses of the invention. In order that those skilled in the art may have a better appreciation of the varied scope of use to which the invention may be put, and by way of illustration only, the following enumeration of proposed uses is given:

I. For exploring natural contours.
   A. To establish plowed fields.
   B. In the mapping of new country with contour maps.
   C. For running lines to establish, or as a preliminary in the establishment of:
     1. Mountain trails.
     2. Railroad lines.
     3. Highways.
     4. Pipe lines.
II. To follow a path laid out on a contour map.
   A. Mountain travel without following trails.
   B. Land torpedo (unmanned tank).
III. To follow a manufactured surface.
   A. Cultivating contour plowed fields.
   B. Highways built for automatically steered automobiles or other automotive vehicles.
   C. Amusement park ride.

An object of the invention is to provide a device for effecting automatic directional control of a vehicle along a path of travel having a fixed gradient which may either be zero (horizontal) or may have a minus or plus angle of inclination to the horizontal.

Another object is to provide a vehicle capable of being controlled automatically in accordance with the contour of a solid surface so as to follow on said surface a path of travel having a predetermined gradient.

The invention consists in the novel features of construction, arrangement, and combination of parts embodied, by way of example, in the apparatus hereinafter described as illustrating a present preferred form of the invention, and the invention will be more particularly pointed out in the appended claim.

Further objects and advantages of the invention will more fully appear from the following description taken in connection with the accompanying drawings which show, by way of example, a present preferred embodiment of the invention.

Figure 2:
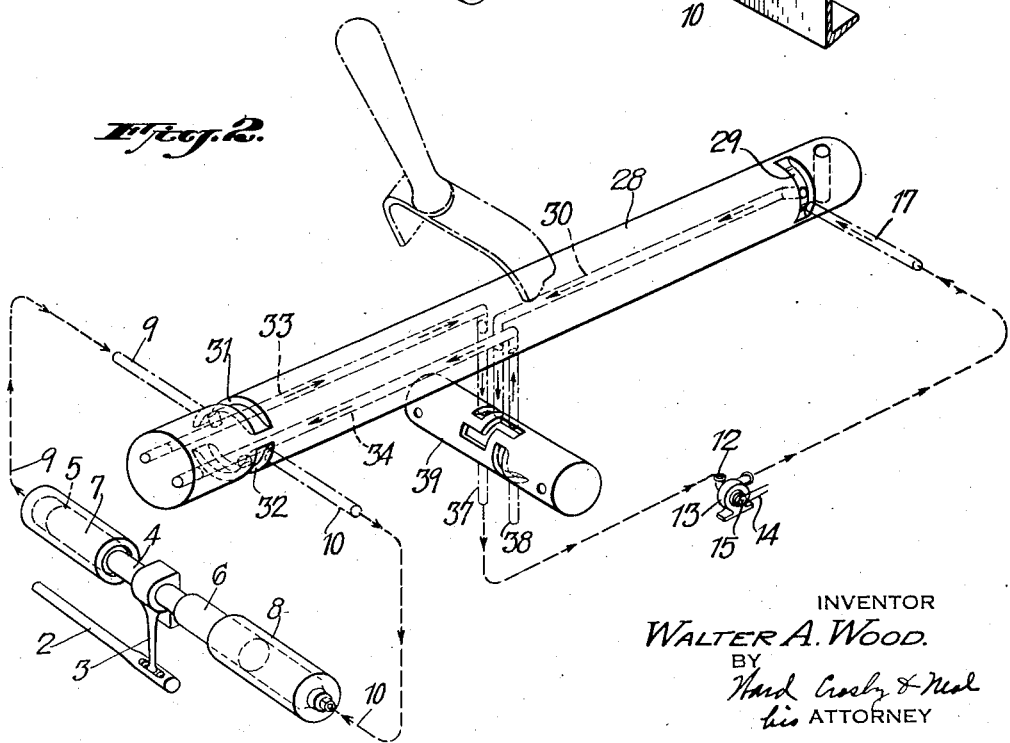

Referring to the accompanying drawings in which the same reference characters indicate the same parts in the various views:

Fig. 1 is a perspective view of the invention partly in section and with certain parts broken away for the sake of simplicity and clarity, Fig. 2 is a partially diagrammatic view illustrating certain further features of Fig. 1, Fig. 3 is a cross-sectional view taken through the valve sleeve 35 and related parts of Fig. 1 in a direction transverse to the axis of the shaft 28 (the section lines having been omitted to avoid confusion in the drawing).

Fig. 4 is a similar view taken through the boss or enlargement 22 of Fig. 1 (the section lines having been omitted for a similar reason), Fig. 5 is a similar view taken through the boss or enlargement 21 of Fig. 1 (the section lines having been omitted for a similar reason), Figs. 6 and 7 are plan views respectively of parts of the device of Fig. 1, Fig. 8 is an elevation, partly in section, showing a modification of the device of Fig. 1, and Fig. 9 is a cross-sectional view taken at 9—9 of Fig. 8, viewed in the direction indicated by the arrows.

Referring more particularly to Fig. 1: The chassis of an automotive vehicle is designated as 1 and the steering rod of said vehicle as 2; such vehicles being exceedingly well known to those skilled in the art, only such parts are illustrated in the drawings as are necessary to a clear understanding of the invention. The forward end of the steering rod 2 is connected to the front wheels of the vehicle (not shown) in any suitable customary manner in such a way that as the rod 12 is moved forward (to the left as viewed in the drawing), from the neutral position, the vehicle is caused to turn to the right; and conversely, as the rod is moved rearwardly, the vehicle is caused to turn to the left.

The invention comprehends the actuation of the steering rod 2 by motive means and the control of the motive means in accordance with the longitudinal and lateral tilting of the solid surface over which the vehicle travels; and in the present embodiment fluid motive means is employed with oil as the actuating fluid. These mechanisms and details thereof will now be more fully described.

The rear end of the steering rod 2 is connected to the lower end of control arm 3, by means of the usual universal ball joint, and the upper end of this arm is rigidly attached to a piston rod 4, which carries on its respectively opposite ends pistons 5 and 6 (Fig. 2) cooperatively positioned in respective single acting cylinders 7 and 8 which are carried by and supported on the chassis frame 1. Actuating fluid is supplied to the respective cylinders 7 and 8 through pipes 9 and 10 in the manner and under conditions to be now more particularly pointed out.

The control unit is supported by the main body of an oil tank 11, which is fixed to and supported on the chassis 1; the tank providing a reservoir for the oil supply for said motive means. The bottom of said reservoir is provided with a filter 12 through which oil passes to a relatively high pressure oil pump 13 formed integrally with said tank 11 and driven from a suitable source of power (not shown) such as by the chain 14 and sprocket 15. To the outlet side of the pump 13 is attached a pipe 16 through which oil under pressure is continuously passed during the operation of said vehicle. The pipe 16 is provided with two terminal branches 17 and 18, the latter being in communication with a relief valve 19 serving to regulate the pressure of oil delivered through the supply branch 17. The oil by-passed through the relief valve 19 returns to tank 11 through an orifice 20. The means for controlling the actuation of said motive means will now be described.

The tank 11 (Fig. 1) is provided on transversely opposite sides with bosses or enlargements 21 and 22 (Figs. 4 and 5) which respectively contain aligned cylindrical bores 23—24 whose common axis is substantially horizontal and extends in a direction normal to the longitudinal axis of said vehicle. The supply branch 17 of the pipe 16 is in fluid communication with said bore 23 through an inlet opening 25, and said bore 24 is in fluid communication with the pipes 9 and 10 through respective outlet openings 26—27. A shaft 28 (Fig. 1) has its respectively opposite ends journaled in said bosses 21 and 22 within said bores 23—24. The end of said shaft journaled in the boss 21 is provided with an inlet port 29 in communication with an inlet passage 30, which extends first inwardly toward the axis of said shaft and then axially to a point intermediate the shaft ends (Fig. 2) and then outwardly and downwardly to the exterior thereof. The opposite end of said shaft 28, journaled in the boss 22, is provided with outlet ports 31—32 in communication respectively with outlet passages 33—34, which each extend first inwardly toward the axis of said shaft and then in an axial direction to said intermediate point and then outwardly and downwardly (Fig. 3) to the exterior thereof on respectively opposite sides of and in transverse parallel alignment with said inlet passage 30, so that the downwardly facing ends of the said passages 30, 33 and 34 lie in close proximity and are disposed in a narrow circumferential zone.

A valve sleeve 35 (Figs. 3 and 1) surrounds and is integrally attached to said shaft 28, as by a press fit. This sleeve is provided with passages 30', 33' and 34' in respective fixed cooperative register with and serve as extensions of the said inlet passage 30 and outlet passages 33 and 34 formed in the shaft or conduit member 28. The sleeve 35 extends vertically downwardly below the shaft 28, when in normal position, and is provided with a bore 36 in communication with the passages 30', 33' and 34', and with downwardly extending vent passages 37 and 38 in axial alignment respectively with the passages 33 and 34. A shaft 39 is journaled within the bore 36 for free rotative movement relative to the valve sleeve 35; the axis of said shaft being normally horizontal and parallel to the longitudinal axis of the vehicle, i. e. normal to the axis of the shaft 28. The shaft 39 (Fig. 6) is provided with an S-shaped port 40 having a central circumferentially extending inlet portion 41 in register with the passage 30' and outwardly axially extending outlet portions 42—43 in alignment for selective registration with the outlet passages 33'—34'; and is also provided with circumferentially extending vent ports 44—45 in alignment for selective registration with and inter-communication of the respective pairs of passages 33'—37 and 34'—38.

The shaft or port member 39 (Figs. 3 and 1) carries securely fastened on its outwardly extending respectively opposite ends, as by means of pins 46—47, bifurcations 48—49 of a control yoke 50. The upper end of the yoke is provided with a handle 51 for manual control, while the lower end carries rigidly attached to the downwardly extending bifurcations 48—49 a weight 52 for automatic control responsive to gravity. It will be seen from the foregoing that the weight 52 acts, under the force of gravity, as a pendulum individually pivoted for individual movement about the respective axes of the shafts 28 and 39 when the vehicle inclines to the horizontal longitudinally and laterally; and that simultaneous inclination imparts simultaneous pivotal movement. The pendulum is immersed in the oil in tank 11 so as to damp its motion.

The structural details heretofore recited relate to a simplified form of the invention for directing the vehicle along a substantially horizontal path, i. e. one having a zero gradient, such as would be followed in establishing the usual contour path. For a more flexible variety of uses, the invention comprehends supplemental mechanism which will now be more particularly described as a modification of certain features of the previously described structure; this modified and supplemental mechanism serving to adapt the device for directional control of vehicles along a path having a predetermined gradient and being adjustable for setting said device for the desired gradient.

Modification

The following modified structure is illustrated in Figs. 8 and 9 and has to do solely with modifications pertaining to the valve means positioned within the enlargement 22 of the tank 11. Instead of the bore 24 (Fig. 4) in the enlargement 22, a substantially larger bore 53 is provided and within this bore is positioned a valve sleeve 54 provided with a solid outer end terminating in a stub shaft 55 which extends outwardly through and is journaled in the end wall of the enlargement 22. This spindle or shaft 55 carries suitably attached to the outwardly extending end a control handle 56 which also serves to hold the sleeve 54 against axial displacement. The sleeve 54 is inserted from the inside of the tank 11, and preferably after such insertion an inside plate or ring 57 is secured over the inner end of the sleeve 54 to provide a suitable bearing surface for purposes of more efficient alignment. The inside diameter of the sleeve 54 serves as a journal for the adjacent end of the shaft 28, and in this respect is the equivalent of the bore 24 (Fig. 4), and this end of the said shaft is journaled therein in the manner previously described. The outer surface of the sleeve 54 is provided with a circumferentially extending port 58 (Fig. 9) which communicates with the inside of said sleeve through an opening 59 which serves to place the port 58 in operative communication with the port 31 and the passage 33 in the shaft 28; the port 58 being so positioned as to be in communication with the outlet passage 26 and the pipe 9 during the range of rotative adjustment of the sleeve 54. The sleeve is also provided with a similar diametrically opposite port 60 operatively connected through the opening 61 with the port 32 and the passage 34. The port 60 is in communication with the passage 27 and pipe 10 during the range of rotative adjustment of the sleeve 54. The handle 56 serves as a means by which the adjustment of the sleeve may be manually effected and suitable indices, such as the index pointer 62 and scale 63, serve as a visual means to indicate the desired setting of the valve sleeve; the scale 63 being graduated in degrees of inclination and declination to the left and right respectively, in the present embodiment provision being made for a plus or minus 45° gradient of inclination. With the index 62 set at zero or neutral position of the scale 63, the condition of operation of the device is identical with that of the parts illustrated in Fig. 4. However, upon adjustment of the valve sleeve to the left or right of the neutral position the vehicle is automatically controlled to follow a path having the desired predetermined gradient.

*Operation*

The operation will first be described in connection with the simplified form of the invention illustrated in Figs. 1–7, inclusive. With a suitable supply of oil in the tank 11, the oil is taken through the strainer 12 into the pump 13 from which it is delivered to the pipe 16 under the desired pressure according to the setting of relief valve 19, and through port 29 in the conduit member 28 and into the inlet passage 30 (Fig. 2) and into the continuing passage 30' (Fig. 3) formed in the valve sleeve 35, which is in communication with the central portion 41 (Figs. 3 and 2). The vehicle is now put into operation and the control means functions as follows under the assumed state of facts. The vehicle tips to the right about its longitudinal axis in accordance with the slope of the terrain downwardly to the right and this causes the pendulum weight 52 to swing about the axis of the shaft or port member 39 in a relatively anticlockwise direction and positions the parts in the condition illustrated in Fig. 2. At this point, if the terrain is horizontal in the fore and aft direction, this merely serves to rotate the shaft or port member 39 (Fig. 2) so that the portion 43 of the S-port comes into register with the passage 34 in the valve sleeve 35 and through this into communication with the outlet passage 34 and the outlet port 32, but as will be seen from Fig. 4 the port 34 is not in communication with either the pipe 9 or 10 and hence no power fluid is transmitted to the motive means. However, assuming that the forward path of travel has a positive gradient or inclines upwardly, the pendulum weight 52 causes the shaft or conduit member 28 to rotate to the position indicated in Fig. 2, which places the port 31 in communication with the pipe 9, and the port 32 in communication with the pipe 10, thereupon permitting the power fluid to flow from the passage 34 through the port 32, through the pipe 10, into the cylinder 8, and to thereby force the piston 6 outwardly carrying with it the steering arm 3 and serving to move the steering rod 2 in a forward direction which will cause the vehicle to turn to the right. At the same time, the fluid in cylinder 7 will be forced outwardly through pipe 9, through port 31 and passage 33, connecting passage 33' (Fig. 3), through port 44 (Fig. 6), and outwardly through vent passage 37 from where it is returned into the reservoir in tank 11. The vehicle continues in this direction only so long as it continues to deviate in the same directions from the horizontal plane laterally and longitudinally, i. e. as long as the differential control valve means maintains the flow of power fluid in the same direction.

Should the vehicle now be restored about its longitudinal axis until there is no inclination in a lateral direction, the port member 39 will be relatively rotated to shut off the power fluid from communication with the motive means; and similarly, if the lateral inclination is maintained but the longitudinal inclination disappears the relative rotation of the conduit member 28 will rotate the ports 31 and 32 out of register with the pipes 9 and 10 and this will also serve to disconnect the power supply from the motive means.

Similarly, with the vehicle tipped to the right as previously described but instead of being tipped at a positive gradient it should be tipped at a negative gradient (Fig. 2), the port 31 will be placed in register with the pipe 10 and the port 32 with the pipe 9, whereupon the power fluid flowing out of passage 34 will pass through port 32 and pipe 9 into cylinder 7 to cause the resultant movement of the steering rod 2 in a rearward direction with a resultant steering of the vehicle to the left; and in such case the return fluid from the cylinder 8 will pass through the pipe 10, port 31, passage 33, vent port 44, and the vent passage 37 back into the tank 11.

In like manner, with the vehicle following either a negative or positive gradient, if it should tip to the left instead to the right laterally as previously described, the port member 39 would be relatively rotated so as to reverse the connection of the inlet passage 30 as between the outlet passages 33 and 34 so as to effect a change of direction of the operation of said motive means, in a manner which will now be understood from the foregoing.

It will be seen from the foregoing that if it is desired to steer the vehicle manually, the gravity responsive control means may be inhibited and the manual control operated as follows. The control handle 51 is pushed forward to manually rotate the conduit member 28 to the position indicated in Fig. 2 and a locking pin 64 is passed through a hole in the enlargement 21 (Fig. 1) and into a cooperating hole extending through the adjacent end of the conduit member 28 and so positioned when in register with the axis of said pin as to hold the ports 31 and 32 on the opposite end of the conduit member 28 in operative communication respectively with the pipes 9 and 10. With the parts locked in this position, the vehicle may be steered by moving the control handle 51 to the left or right so as to effectively connect the fluid power to one or the other of the cylinders of the motive means to thereby bring about the manual directional control of the vehicle at will.

With the modified form of device the operation is as follows. Assuming that it is desired to have the vehicle follow a path of travel having a fixed gradient greater or less than zero: the operator grasps the handle 56 (Figs. 8 and 9) and moves it to the left or right of the neutral position in accordance with the gradient desired whether positive or negative. This selective setting predetermines the gradient of the path to be traveled by the vehicle under automatic control by setting the intermediate sleeve valve 54 so that the rotation of the ports 31 and 32 in the shaft or conduit member 28 will be effective with reference to a plane having a longitudinal inclination of the desired degree rather than from a plane which is horizontal in a longitudinal direction. For example, with the device set as illustrated in Fig. 9, and with the vehicle at a negative gradient inclination of the order indicated, the shaft or conduit member 28 will assume an anti-clockwise position, as viewed in Fig. 9, so that the openings 59 and 61 will be closed by that portion of the shaft lying between the ports 31 and 32, with the result that the motive means will not be operated; and from this predetermined angle of inclination the device will operate in a manner substantially as heretofore described.

Having thus described my invention with particularity with reference to its preferred form, it will be obvious to those skilled in the art, after understanding my invention, that other changes and modifications may be made therein without departing from the spirit and scope of my invention, and I aim in the appended claims to cover such changes and modifications as are within the scope of the invention.

What I claim is:

1. In a device for directional control of vehicles, the combination of motive means for steering the vehicle and means for automatically controlling the actuation of said motive means, said control means being responsive to the individual inclination of said vehicle respectively in relatively transverse directions and being effective to automatically cause the actuation of said motive means only upon the simultaneous inclination of said vehicle in both of said directions.

2. In a device for directional control of vehicles, the combination of motive means for steering the vehicle and a plurality of means for automatically controlling said motive means, said plurality of control means being individually responsive respectively to the inclination of said vehicle in a plurality of transverse directions and each being complementary to the remainder of said plurality for effecting the actuation of said motive means.

3. In combination, a vehicle, motive means for steering said vehicle, and means for automatically controlling the actuation of said motive means, said controlling means being responsive to the individual inclination of said vehicle respectively in relatively transverse directions and effective to automatically cause the actuation of said motive means only upon the simultaneous inclination of said vehicle in both directions.

4. In combination, a vehicle, motive means for steering said vehicle, a source of power for actuating said motive means and differential means responsive to different directions of deviation of said vehicle from a given plane for automatically controlling the actuation of said motive means by and through the control of the supply of power to said motive means.

5. In a device for directional control of vehicles, the combination of motive means for steering the vehicle, and a first and a second means for conjointly controlling the actuation of said motive means, one of said control means being responsive to the gradient of the path traveled by said vehicle and the other being responsive to the transverse inclination of said vehicle.

6. In a device for directional control of vehicles, the combination of motive means for steering the vehicle, a first means and a second means for conjointly controlling the actuation of said motive means, one of said control means being responsive to the gradient of the path traveled by said vehicle and the other being responsive to the transverse inclination of said vehicle, and manually operable means for inhibiting the conjoint response of said control means and for effecting the operation of said motive means at will.

7. In a device for guiding a vehicle along a path having a predetermined gradient, the combination of motive means for steering the vehicle, a first and a second means for conjointly controlling the actuation of said motive means, one of said control means being responsive to deviation from the desired gradient of the path to be traveled by said vehicle and the other being responsive to the transverse inclination of said vehicle, and means for setting said device to operate in accordance with the selected gradient.

8. In a device for directional control of vehicles, the combination of fluid motive means for steering the vehicle, a first gravity controlled valve means interposed in the path of the power fluid and operable in accordance with the longitudinal inclination of said vehicle, and a second gravity controlled valve means interposed in said path of the power fluid and operable in accordance with the lateral inclination of said vehicle, said first and second valve means serving to conjointly control the actuation of said motive means.

9. In a device for directional control of vehicles, the combination of fluid motive means for steering the vehicle, a first valve means interposed in the path of the power fluid, and a second valve means interposed in said path of the power fluid, pendulum means for operating said first and said second valve means in accordance with the respective longitudinal and lateral inclination of said vehicle, said first and second valve means conjointly serving to control the actuation of said motive means.

10. In a device for directional control of vehicles, the combination of motive means for steering the vehicle, a first valve means interposed in the path of the power fluid, a second valve means interposed in said path of the power fluid, pendulum means for operating said first and said second valve means in accordance with the respective longitudinal and lateral inclination of said vehicle, and means for adjusting said first valve means to become effective at a predetermined longitudinal angle, said first and second valve means serving to control the actuation of said motive means.

11. In a device for directional control of vehicles, the combination of fluid motive means for steering the vehicle, a conduit member freely journaled for rotative movement about a normally substantially horizontal axis, said member being provided with an inlet conduit and a first and a second outlet conduit, a fixed inlet conduit in communication with an outer end of said inlet conduit during rotative movements of said member, two fxed outlet conduits in selective communication respectively with outer ends of said first and second outlet conduits at certain rotative positions of said member, a valve sleeve secured to said conduit member for rotative movement therewith and provided with passages in communication with inner ends of said inlet and outlet conduits in said conduit member, a port member freely journaled in said valve sleeve for rotative movement about a normally substantially horizontal axis transverse to said conduit member axis and provided with port means for individually selectively placing one of said outlet conduits in communication with said inlet conduit at certain rotative positions of said port member, and gravity responsive means for imparting rotative movement to said conduit member and said port member.

12. In a device for directional control of vehicles, the combination of hydraulic motive means for steering the vehicle, fluid pressure supply means for said motive means, a conduit member freely journaled for rotative movement about a normally substantially horizontal axis, said member being provided with an inlet conduit and a first and a second outlet conduit, a fixed inlet conduit in communication with an outer end of said inlet conduit during rotative movements of said member, two fixed outlet conduits in selective communication respectively with outer ends of said first and second outlet conduits at certain rotative positions of said member, a valve sleeve secured to said conduit member for rotative movement therewith and provided with passages in communication with inner ends of said inlet and outlet conduits in said conduit member, a port member freely journaled in said valve sleeve for rotative movement about a normally substantially horizontal axis transverse to said conduit member axis and provided with port means for individually selectively placing one of said outlet conduits in communication with said inlet conduit and the other of said inlet conduits in return communication with said fluid supply at certain rotative positions of said port member, and gravity responsive means for imparting rotative movement to said conduit member and said port member.

WALTER A. WOOD.